United States Patent [19]

Yeager et al.

[11] Patent Number: 4,863,984

[45] Date of Patent: Sep. 5, 1989

[54] FLAME RETARDANT EXTRUDATE OF POLYPHEYLENE ETHER BLENDS, AND METHOD OF MAKING

[75] Inventors: Gary W. Yeager; Dwain M. White; Arnold Factoe, all of Schenectady; Factir Arnold, Scotia; William R. Haaf, Voorheesville, all of N.Y.; William R. Haaf, Voorheesville, all of N.Y.

[73] Assignee: General Electric Company, Schenectady, N.Y.

[21] Appl. No.: 92,785

[22] Filed: Sep. 3, 1987

[51] Int. Cl.$^4$ .................. C08G 65/48; C08K 5/18; C08L 71/04

[52] U.S. Cl. ..................... 524/157; 428/457; 524/236; 525/132; 525/905

[58] Field of Search ................. 524/157, 236

[56] References Cited

U.S. PATENT DOCUMENTS

| | | | |
|---|---|---|---|
| 2,810,703 | 10/1957 | Sims | 525/157 |
| 3,563,934 | 2/1971 | Burnett | 524/96 |
| 4,359,538 | 11/1982 | Bertrand | 521/79 |
| 4,537,925 | 8/1985 | Luxon | 524/151 |

FOREIGN PATENT DOCUMENTS 226046 12/1984 Japan ................. 524/236

Primary Examiner—Jacob Ziegler
Attorney, Agent, or Firm—William A. Teoli; James C. Davis, Jr.; William H. Pittman

[57] ABSTRACT

Extrudate of polyphenylene ether-styrene resin blends having effective amounts of an organoamine salt has been found to have improved flame retardance.

6 Claims, No Drawings

FLAME RETARDANT EXTRUDATE OF POLYPHEYLENE ETHER BLENDS, AND METHOD OF MAKING

CROSS-REFERENCE TO RELATED APPLICATIONS

Reference is made to copending application Ser. No. 092,786, and Ser. No. 092,784, now U.S. Pat. No. 4,757,107, filed concurrently herewith and assigned to the same assignee as the present invention and incorporated herein by reference.

BACKGROUND OF THE INVENTION

As discussed in U.S. Pat. No. 4,024,093 (Abolins et al.), ferric salts such as ferric stearate can be employed in combination with a halogenated aromatic compound such as hexabromobiphenyl to impart improved flame retardant properties to the polyphenylene ether blend.

As shown by Japanese Patent J59-226046 (June 7, 1983), ammonium salts also have been described as effective flame retardants for blends of polyphenylene ether and styrene resins. For example, blends of 50 parts by weight of polyphenylene ether and 50 parts by weight of rubber modified high impact polystyrene were rendered V-O by the addition of 5 parts by weight of ammonium bromide or ammonium chloride. Blends comprised of 30 parts by weight of polyphenylene ether, and 70 parts by weight of high impact polystyrene requires 10 parts of ammonium bromide to achieve V-O flame-out times.

It would be desirable, therefore, to make flame-retardant blends of polyphenylene ether and polystyrene resin without the employment of a significant amount of polyhalogenated aromatic compounds or excessive amounts of ammonium halides which are difficult to disperse during the processing of blends of polyphenylene ether and polystyrene resin under melt conditions because the ammonium salts are generally of a crystalline nature.

The present invention is based on our discovery that organoamine salts having the formula

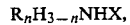

$$R_nH_{3-n}NHX, \quad (1)$$

have been found to be more readily compatible with the polyphenylene ether blends in the melt and have been found to impart flame retardance to extrudate of such polyphenylene ether blends when incorporated in such blends in effective amounts prior to extrusion, where R is a $C_{(1-14)}$ monovalent hydrocarbon radical and preferably a $C_{(1-8)}$ alkyl radical, X is a halogen radical or an organosulfonate radical, and n is an integer having a value of from 1-3 inclusive.

As used hereinafter, the term "extrudate" means polyphenylene ether blend which has been melt extruded in contact with a ferruginous surface.

STATEMENT OF THE INVENTION

There is provided by the present invention, flame retardant extrudate of a polyphenylene ether blend comprising
(A) polyphenylene ether,
(B) polystyrene resin, and
(C) an effective amount of an organoamine salt of formula (1).

There are included by the organoamine salts of formula (1) reaction products of certain Brönsted acids as defined hereinafter, and amines such as methylamine, ethylamine, n-butylamine, n-octylamine, isopropylamine sec-butylamine, benzylamine, di-methylamine, diethylamine, di-n-butylamine, di-n-octyl-amine, diisopropylamine, di-sec-butylamine dibenzylamine, tri-methylamine, triethylamine tri-n-butylamine, tri-n-octylamine, triisopropylamine, tri-sec-butylamine, tri-benzylamine, aniline, diphenylamine and triphenylamine. These amines may be chemically combined with Brönsted acids such as hydrogen bromide, hydrogen chloride, hydrogen iodide, methanesulfonic acid, toluenesulfonic acid, benzene sulfonic acid, trifluoromethane sulfonic acid, and trifluoroacetic acid, to form their corresponding ammonium salts.

The polyphenylene ethers which can be utilized in the practice of the present invention include polyphenylene ethers comprising a plurality of structural units having the formula

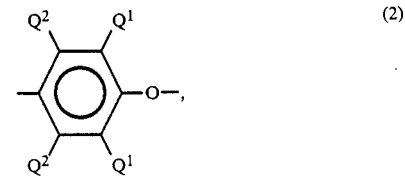

where in each of said units, independently, each $Q^1$ is halogen, primary or secondary lower alkyl (i.e., alkyl containing up to 7 carbon atoms), alkenyl, such as allyl, phenyl, haloalkyl, aminoalkyl, glycidyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are known. The homopolymers include those containing, for example, 2,6-dimethyl-1,4-phenylene ether units. The copolymers include random copolymers containing such units in combination with (for example) 2,3,6-trimethyl-1,4-phenylene ether units. Many suitable random copolymers, as well as homopolymers, are disclosed in the patent literature.

Particularly useful are poly(2,6-dimethyl-1,4-phenylene ethers). Suitable polymers generally have a number average molecular weight within the range of about 5,000–40,000 and a weight average molecular weight within the range of about 20,000–80,000, as determined by gel permeation chromatography. Their intrinsic viscosities are preferably in the range of about 0.35–0.6 dl/g, as measured in chloroform at 25° C.

Also known are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other polyphenylene ethers are coupled polymers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

Polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. For the most part, they contain at least one heavy metal compound such as a copper, manganese or cobalt compound, usually in combination with various other materials.

Catalyst systems containing a copper compound are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Other catalyst systems contain manganese compounds. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also known are cobalt-containing catalyst systems. Suitable manganese and cobalt-containing catalyst systems for polyphenylene ether preparation are known in the art by reason of disclosure in numerous patents and publications.

The polyphenylene ethers which are used in accordance with the practice of the present invention can be blended with styrene resin, or polyvinyl aromatic resin which preferably has at least 25% of the chemically combined units of the styrene resin of the formula

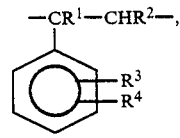
(3)

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen and lower alkyl of from 1 to 6 carbon atoms.

Materials which can be copolymerized with vinyl aromatic monomer to make the styrene resin used in the blend of the present invention include those having the general formula

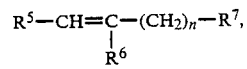

where $R^5$ and $R^6$ are members selected from the class consisting of hydrogen, halogen, an alkyl group of 1–4 carbon atoms, carboalkoxy or $R^5$ and $R^6$ taken together can be an anhydride linkage (—COOOC—), and $R^7$ is selected from hydrogen, vinyl, an alkyl or alkenyl group having 1 to 12 carbon atoms, cycloalkyl, carboalkoxy, alkoxy-alkyl, alkyl carboxy, ketoxy, halogen, carboxy, cyano or pyridyl and n is a whole number between 0 and 9.

The general formula set forth includes by way of example, homopolymers such as polystyrene and monochloropolystyrene, the modified polystyrenes, such as rubber-modified, high-impact polystyrene and styrene containing copolymers, such as the styrene-acrylonitrile copolymers, styrene butadiene copolymers, styrene-acrylonitrilealkyl styrene copolymers, styrene-acrylonitrile-butadiene copolymers, polymethylstyrene, copolymers of ethylvinylbenzene, and divinylbenzene; styrene-maleic anhydride copolymers; styrene-butadiene-styrene block copolymers and styrene-butadiene block copolymers; and styrene-butadiene-styrene maleic anhydride block copolymers.

The flame retardant blends of the present invention also can include reinforcing fillers such as glass roving, glass fiber, mineral clay, mica and silica; also plasticizers, impact modifiers, antioxidants, flow promoters, etc. The reinforcing fillers can be present at up to 50 parts by weight of filler per 100 parts by weight of blend. The compositions of the present invention can be prepared by blending in a Henschel mixer and thereafter compounded in a Werner-Pfleiderer extruder. The extrudate can be chopped into pellets and molded on a Newbury injection molding machine.

An effective amount of organoamine salt of formula (1) is sufficient salt to provide from about 0.03 part to 2 parts by weight of nitrogen, per 100 parts by weight of polyphenylene ether and preferably about 0.1 to 1 part.

In the practice of the invention, the organoamine salt can be prepared by slow addition of an appropriate Bronsted acid to an ethanolic solution of the organoamine. After an excess of the acid has been added, treatment of the resulting mixture with ether can induce crystallization and separation of the organoamine salt. The organoamine salt can be isolated by filtration and dried under vacuum. The organoamine salt can be added to the blend of the polyphenylene ether and styrene resin. Formulations can be compounded at 250° to 320° C. using a W.P. twin screw extruder.

In order that those skilled in the art will be better able to practice the invention, the following examples are given by way of illustration and not by way of limitation. All parts are by weight.

EXAMPLE 1

A series of di-n-butyl ammonium salts were prepared utilizing an absolute ethanol solution of di-N-butylamine. In preparing di-n-butylammonium bromide, hydrogen bromide gas was introduced into a solution of 585 grams of di-n-butylamine in absolute ethanol until the solution was saturated. The reaction vessel was in an ice bath during the addition. The solution was then treated with ether followed by further cooling to induce crystallization. The product was isolated by filtration, washed thoroughly with ether, and dried for about 12 hours in a vacuum oven (80° C. at about 15 torr). There was obtained an 83.7% yield of di-n-butylammonium bromide, MP 295°–296.5° C.

The same procedure was used to prepare di-n-butyl ammonium chloride and di-n-butyl ammonium methane sulfonate.

A series of blends containing the above dibutylamine salts were made with equal part mixtures of PPO polyphenylene ether (0.40 IV or 0.46 IV) and high impact polystyrene (American Hoescht AH1897). The dry blend was blended in a Henschel mixer and then held mixed at about 590° F. using a W.P. twin screw extruder. The resulting extrudate was quenched in cold water in a cold water bath, air dried and pelletized. The pelletized blend was dried at 90° C. for one hour. The dried blend was then molded into 5"×0.5"×0.125 bars using a Newbury injection molder with a general purpose screw. The flame retardance of the resulting blend was then evaluated using the UL-94 test procedure. The following results were obtained where DBA means dibutylamine:

| DBA.salt (pph) | Notched Izod (ft-lbs/in) | TYS* (psi) | TE+ (%) | ⅛" UL-94 FOT | Rating |
| --- | --- | --- | --- | --- | --- |
| — | 3.6 | 8890 | 25 | 34.5 dr | Fail |
| 0.67 DBA.HBr | 4.4 | 8880 | 24 | 8.4 | V-1 |
| 2.10 DBA.HBr | 4.3 | 9140 | 22 | 4.6 | V-0 |
| 0.55 DBA.HBr | 4.2 | 9200 | 24 | 10.6 | Fail |
| 1.65 DBA.HCl | 4.3 | 8920 | 24 | 14.9 | Fail |
| 0.75 DBA.HO₃SCH₃ | 3.9 | 9380 | 22 | 14.0 | Fail |
| 2.25 DBA.HO₃SCH₃ | 4.4 | 8990 | 22 | 16.4 | Fail |

*TYS — tensile yield strength
+TE — tensile elongation

The above results show that the dibutylamine hydrobromide imparted V-O flame retardancy to the equal parts blend of polyphenylene ether and high impact polystyrene. The hydrochloride and sulfonate dibutylamine salts also imparted improved flame retardancy to the polyphenylene ether blend as compared to the blend free of the dibutylamine salt.

EXAMPLE 2

The procedure of Example 1 was repeated except that a comparison was made between equal part blends of polyphenylene ether (PPE) and HIPS using 3 parts by weight per 100 of the blend of ammonium bromide, triethylamine hydrobromide and methylamine bromide. The following results were obtained, where "FD" means flame dripped:

| Amine.HBr (pbw) | PPE (pbw) | HIPS (pbw) | Avg FOT (sec) | Notched Izod+ |
| --- | --- | --- | --- | --- |
| NH₄Br(3) | 50 | 50 | 2.61 (V-0) | 3.76 |
| (CH₃CH₂)₃NHBr(3) | 50 | 50 | 4.77 (V-0) | 4.80 |
| CH₃NH₃Br(3) | 50 | 50 | 2.54 (V-0) | 4.36 |
| control | 50 | 50 | FD (fail) | 4.42 |

+Notched Izod in ft-lbs/in

The above results show that alkylamine salts provided improved notched Izod while exhibiting equivalent or superior flame retardance compared to ammonium bromide. A possible explanation is that alkylamine salts disperse better than ammonium salts during blending and extrusion.

Although the above examples are directed to only a few of the very many variables which can be used in the practice of the present invention, it should be understood that the present invention is directed to a much broader variety of organoamine salts and polyphenylene ether polystyrene resin blends as shown in the description preceding these examples.

What is claimed and sought to be protected by Letters Patent of the U.S. is as follows:

1. Flame retardant extrudate of polyphenylene ether blends comprising
  (A) polyphenylene ether,
  (B) styrene resin, and
  (C) an effective amount of an organoamine salt of the formula $$R_nH_{3-n}NHX,$$

where R is a $C_{(1-14)}$ monovalent hydrocarbon radical, X is a halogen radical, or an organosulfonate radical, and n is an integer having a value of from 1–3 inclusive.

2. A flame retardant extrudate in accordance with claim 1, where the organoamine salt is a di-n-butylamine hydrobromide.

3. A flame retardant extrudate in accordance with claim 1, where the organoamine salt is di-n-butylamine hydrochloride.

4. A flame retardant extrudate in accordance with claim 1, where the organoamine salt is di-n-butylamine methyl sulfonate.

5. A flame retardant extrudate in accordance with claim 1, where the organoamine salt is methylamine hydrobromide.

6. A flame retardant extrudate in accordance with claim 1, where the organoamine salt is triethylamine hydrobromide.

* * * * *

UNITED STATES PATENT AND TRADEMARK OFFICE
CERTIFICATE OF CORRECTION

PATENT NO. : 4,863,984

DATED : September 5, 1989

INVENTOR(S) : Gary W. Yeager, et al.

It is certified that error appears in the above-identified patent and that said Letters Patent is hereby corrected as shown below:

Cover Page, cancel the following:

Gary W. Yeager; Dwain M. White;
    Arnold Factoe, all of Schenectady;
    Factir Arnold, Scotia; William R.
    Haaf, Voorheesville, all of N.Y.;
    William R. Haaf, Voorheesville, all
    of N.Y.

Cover Page, substitute the following:

--Gary W. Yeager; Dwain M. White; James E. Pickett,
    all of Schenectady; Arnold Factor, Scotia and
    William R. Haaf, Voorheesville, all of N.Y.--.

Signed and Sealed this

Thirty-first Day of July, 1990

Attest:

HARRY F. MANBECK, JR.

Attesting Officer

Commissioner of Patents and Trademarks